US012177597B2

(12) United States Patent
Thomasian et al.

(10) Patent No.: US 12,177,597 B2
(45) Date of Patent: Dec. 24, 2024

(54) EYE CONTACT OPTIMIZATION

(71) Applicant: Microsoft Technology Licensing, LLC, Redmond, WA (US)

(72) Inventors: Eric Edmond Thomasian, Los Angeles, CA (US); Shaun Paul Dunning, San Clemente, CA (US); Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 17/953,066

(22) Filed: Sep. 26, 2022

(65) Prior Publication Data
US 2024/0106969 A1 Mar. 28, 2024

(51) Int. Cl.
*H04N 5/262* (2006.01)
*G06T 7/73* (2017.01)
(Continued)

(52) U.S. Cl.
CPC ............. *H04N 5/2624* (2013.01); *G06T 7/73* (2017.01); *G06V 20/41* (2022.01); *G10L 17/00* (2013.01);
(Continued)

(58) Field of Classification Search
CPC ........ H04N 5/2624; H04N 7/147; H04N 7/15; H04N 5/262; G06T 7/73;
(Continued)

(56) References Cited

U.S. PATENT DOCUMENTS 6,507,356 B1    1/2003   Jackel et al.
7,634,533 B2   12/2009   Rudolph et al.
(Continued)

FOREIGN PATENT DOCUMENTS

JP     2017130046 A    7/2017
WO     2010053473 A1   5/2010
(Continued)

OTHER PUBLICATIONS

"Non Final Office Action Issued in U.S. Appl. No. 16/914,136", Mailed Date: Jun. 2, 2021, 26 Pages.
(Continued)

*Primary Examiner* — Yosef K Laekemariam
(74) *Attorney, Agent, or Firm* — NovoTechIP International PLLC

(57) ABSTRACT

Systems and methods for conducting a videoconference including receiving multimedia streams of a plurality of participants in a multimedia conference, the multimedia streams including audio components and video components and displaying video tiles of the participants on a display screen. The audio components and/or the video components of the multimedia streams are analyzed to detect characteristics indicative of a first participant and a second participant having a first conversation with each other. Camera positions on the computing devices of the participants are identified. In response to identifying that the first participant and the second participant are having the first conversation with each other, a video tile for the first participant and a video tile for the second participant are moved to edges of the respective display screens toward the camera positions.

20 Claims, 12 Drawing Sheets

(51) Int. Cl.
*G06V 20/40* (2022.01)
*G10L 17/00* (2013.01)

(52) U.S. Cl.
CPC .............. *G06T 2207/10016* (2013.01); *G06T 2207/30201* (2013.01); *G06T 2207/30244* (2013.01)

(58) Field of Classification Search
CPC . G06T 2207/10016; G06T 2207/30201; G06T 2207/30244; G06V 20/41; G06V 20/40; G10L 17/00
See application file for complete search history.

(56) References Cited

U.S. PATENT DOCUMENTS

| | | | |
|---|---|---|---|
| 8,587,634 | B1 | 11/2013 | Baldino |
| 9,041,765 | B2 | 5/2015 | Periyannan et al. |
| 9,491,374 | B1 | 11/2016 | Avrahami et al. |
| 11,089,262 | B1 | 8/2021 | Barrett et al. |
| 11,132,535 | B2 | 9/2021 | Sova |
| 2004/0008155 | A1* | 1/2004 | Cok ................. G06F 3/1446 345/1.3 |
| 2004/0223061 | A1 | 11/2004 | Bear et al. |
| 2011/0193935 | A1 | 8/2011 | Gorzynski |
| 2012/0140023 | A1 | 6/2012 | Cutler |
| 2012/0182381 | A1 | 7/2012 | Abate et al. |
| 2012/0274736 | A1 | 11/2012 | Robinson et al. |
| 2013/0342637 | A1* | 12/2013 | Felkai ................ H04L 69/24 348/E7.083 |
| 2014/0002586 | A1 | 1/2014 | Nourbakhsh |
| 2015/0091794 | A1* | 4/2015 | Ha ..................... G06F 3/013 345/156 |
| 2015/0092013 | A1 | 4/2015 | Noisette et al. |
| 2015/0373303 | A1 | 12/2015 | Visosky |
| 2016/0077592 | A1 | 3/2016 | Aull et al. |
| 2016/0231872 | A1 | 8/2016 | Tamura et al. |
| 2016/0359941 | A1 | 12/2016 | Kvaal et al. |
| 2020/0099889 | A1 | 3/2020 | Sugihara |
| 2021/0405865 | A1 | 12/2021 | Faulkner |
| 2022/0256094 | A1 | 8/2022 | Meyer |

FOREIGN PATENT DOCUMENTS

| | | |
|---|---|---|
| WO | 2013140359 A2 | 9/2013 |
| WO | 2021257868 A1 | 12/2021 |

OTHER PUBLICATIONS

"Final Office Action Issued in U.S. Appl. No. 16/914,136", Mailed Date: Mar. 9, 2022, 13 Pages.

"International Search Report and Written Opinion Issued in PCT Application No. PCT/US2021/027870", Mailed Date: Sep. 17, 2021, 18 Pages.

"Invitation To Pay Additional Fees issued in PCT Application No. PCT/US2021/027870", Mailed Date: Jul. 27, 2021, 16 Pages.

Tausif, et al., "Towards Enabling Eye Contact and Perspective Control in Video Conference", In Proceedings the 33rd Annual ACM Symposium on User Interface Software and Technology, Oct. 20, 2020, pp. 96-98.

Yezhova, Liza, "Making video call participants draggable in an Electron app (Part 3)", Retrieved from: https://www.daily.co/blog/making-video-call-participants-draggable-in-an-electron-app/, Dec. 27, 2021, 8 Pages.

International Search Report and Written Opinion received for PCT Application No. PCT/US2023/030984, mailed on Nov. 24, 2023, 17 pages.

* cited by examiner

EYE CONTACT OPTIMIZATION

BACKGROUND

In recent years, the use of video conferencing has become increasingly popular for enabling multiple parties located at multiple remote locations to communicate and collaborate with each other. For example, the wide availability of broadband Internet connectivity and inexpensive video capture and display equipment has made video conferencing technology easily accessible. Video conferencing systems can include both dedicated systems that have all required components packaged into a specialized apparatus, and personal computer (PC) based systems that include a general-purpose computer having a webcam, communication software, and a broadband Internet connection.

One goal of video conferencing technology is serving as a viable substitute for in-person meetings. However, one obstacle to the widespread acceptance of video conferencing is the inability of video conferencing systems to promote user engagement during live video conferences. This is due in part to the perceived lack of eye contact between participants of the video conference. In most implementations, a video camera is placed at the perimeter of a participant's display screen while the video images of other participants are located on the display screen some distance from the camera. The natural impulse is for a user to look at the video images of the other participants on the display screen during the video conference rather than look at the camera. As a result, even though the user may be maintaining eye contact with the video images of the other participants, it appears to the other participants that the user is not looking at them at all which can create the false impression that the user is either avoiding eye contact or distracted. This can also result in the video images of the user showing the side or top of the user's head rather than a straight-on view of the user's face which can obscure the user's facial expressions and gestures thereby further limiting the ability of the user to communicate effectively during the video conference.

The issues noted above also highlight another problem associated with video conference technologies which is the inability to facilitate back-and-forth conversations between two participants of a video conference, especially when there are large numbers of participants. Video conference systems typically display the video images of the participants in tiles that are arranged in a predetermined pattern on the display screen based at least in part on a scheme that is set by the system. Video conference systems are usually capable of identifying the current speaker and alters the display of the tile associated with the current speak in a manner that facilitates viewing by the other participants, e.g., by highlighting the tile, increasing the size and/or position of the tile, and the like. As different participants speak during the video conference, the system alters the displays of their tiles in turn to ensure that the current speaker is always indicated. However, when two or more speakers are having a back-and-forth conversation, the participant that is currently speaking can change rapidly. This in turn can result in rapid changes to the display of the current speaker on the participant's screens which can be distracting and hard to follow.

What is needed are systems and methods that improve the ability of video conferencing systems to simulate in-person meetings by facilitating eye contact as well as back-and-forth conversations between participants of video conferences.

SUMMARY

In one general aspect, the instant disclosure presents a method for conducting a videoconference with a plurality of participants with each of the participants utilizing a device for transmitting a multimedia feed of a participant associated with the device and receiving multimedia feeds from devices associated with other participants in the video conference. The method comprises receiving the multimedia feeds from the plurality of devices associated with each of the participants in the videoconference, the multimedia feeds including an audio component and a video component; displaying tiles on a display screen of the device of each of the participants, each of the tiles showing the video component of one of the multimedia feeds, respectively; analyzing at least one of the audio component and the video component of a plurality of the multimedia feeds to detect characteristics indicative of a first participant and a second participant having a first conversation with each other; identifying a first camera position for a camera on a device of the first participant and a second camera position for a camera on a device of the second participant; responsive to the identifying that the first participant and the second participant are having the first conversation with each other: moving a tile for the first participant on a display screen of the device of the second participant from a first location to a second location, the second location being closer to the second camera position than the first location; and moving a tile for the second participant on a display screen of the device of the first participant from a third location to a fourth location, the fourth location being closer to the first camera position than the third location.

In another general aspect, the instant disclosure presents a data processing system having a processor and a memory in communication with the processor wherein the memory stores executable instructions that, when executed by the processor, cause the data processing system to perform multiple functions. The functions may include receiving multimedia streams of a plurality of participants in a multimedia conference, the multimedia streams including audio components and video components; displaying video tiles on a display screen of a device of at least one of the participants, each of the video tiles showing the video component of one of the multimedia streams; analyzing the audio components and/or the video components of the multimedia streams to detect characteristics indicative of a first participant and a second participant having a first conversation with each other; identifying a camera position for a camera of the device; and responsive to the identifying that the first participant and the second participant are having the first conversation with each other, moving a video tile for the first participant and a video tile for the second participant to an edge of the display screen in a direction of the camera position.

In a further general aspect, the instant application describes a non-transitory computer readable medium on which are stored instructions that when executed cause a programmable device to perform functions of receiving multimedia streams of a plurality of participants in a multimedia conference, the multimedia streams including audio components and video components; displaying video tiles on a display screen of a device of at least one of the participants, each of the video tiles showing the video component of one of the multimedia streams; analyzing the audio components and/or the video components of the multimedia streams to detect characteristics indicative of a first participant and a second participant having a first conversation with each other; identifying a camera position for a camera of the device; and responsive to the identifying that the first participant and the second participant are having the first conversation with each other, moving a video tile for the first participant and a video tile for the second participant to an edge of the display screen in a direction of the camera position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
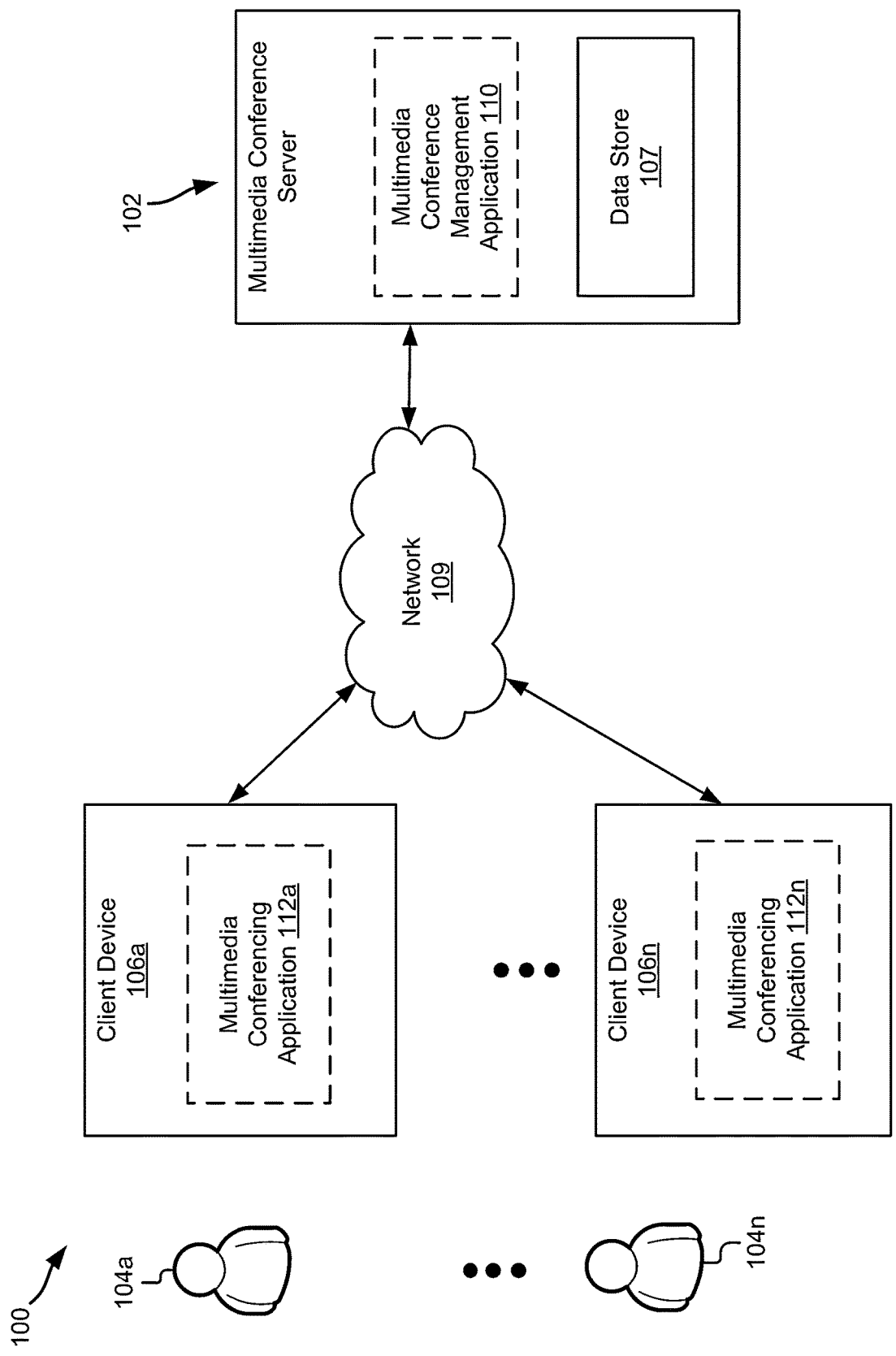
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

One goal of video conferencing technology is serving as a viable substitute for in-person meetings. However, one obstacle to the widespread acceptance of video conferencing is the inability of video conferencing systems to promote user engagement during live video conferences. This is due in part to the perceived lack of eye contact between participants of the video conference. In most implementations, a video camera is placed at the perimeter of a participant's display screen while the video images of other participants are located on the display screen some distance from the camera. The natural impulse is for a user to look at the video images of the other participants on the display screen during the video conference rather than look at the camera. As a result, even though the user may be maintaining eye contact with the video images of the other participants, it appears to the other participants that the user is not looking at them at all which can create the false impression that the user is either avoiding eye contact or distracted. This can also result in the video images of the user showing the side or top of the user's head rather than a straight-on view of the user's face which can obscure the user's facial expressions and gestures thereby further limiting the ability of the user to communicate effectively during the video conference.

Another problem associated with video conference technologies which is the inability to facilitate back-and-forth conversations between two participants of a video conference, especially when there are large numbers of participants. Video conference systems typically display the video images of the participants in tiles that are arranged in a predetermined pattern on the display screen based at least in part on a scheme that is set by the system. Video conference systems are usually capable of identifying the current speaker and alters the display of the tile associated with the current speak in a manner that facilitates viewing by the other participants, e.g., by highlighting the tile, increasing the size and/or position of the tile, and the like. As different participants speak during the video conference, the system alters the displays of their tiles in turn to ensure that the current speaker is always indicated. However, when two or more speakers are having a back-and-forth conversation, the participant that is currently speaking can change rapidly. This in turn can result in rapid changes to the display of the current speaker on the participant's screens which can be distracting and hard to follow.

Lack of eye contact and lack of the ability to effectively see and understand non-verbal cues during video conferences can result in a lack of engagement in the video conference. This lack of engagement can cause inefficiencies as it may take more time and effort to effectively convey information between parties. For example, missed facial expressions, gestures and other non-verbal clues during a video conference can lead to a need for prolonged meetings, additional meetings, and/or a need for the use of additional communication mediums, which require additional consumption of computing resources. As a result, users may become reluctant to participate in online meetings and video conferences.

The technical problem posed by video conferencing technology is how to improve the ability of the technology to simulate and/or serve as a viable substitute for in-person meetings and conferences. The technical problem is a problem specifically arising in the realm of the internet and computer networks because online meetings can only occur over computer networks and the problem is rooted in the ability of online meeting and videoconferencing technology to enable such meetings.

To address these technical problems and more, in an example, this description provides technical solutions in the form of eye contact optimization systems and methods that may be used with video conference technology that can improve the ability of the multimedia conference system to simulate in-person meetings by facilitating eye contact as well as back-and-forth conversations between participants of video conferences. The eye contact optimization system is configured to analyze the audio and/or video components of the multimedia streams received from the client devices to detect characteristics indicative of two or more participants having a back-and-forth conversation during the multimedia conference, to identify the locations of the cameras for the client devices of the participants in the multimedia conference, and to control the manner in which the videos of the participants having the conversation are displayed on each other's devices (and in some cases the devices of the other participants as well) so it appears that the participants having the conversation are making eye contact with each other during the conversation.

The technical solutions provided herein promote user engagement by facilitating verbal as well as non-verbal communications between participants of online meetings and video conferences. This in turn can lead to improvements in the efficiency of using video conferencing technology as it may take less time and effort to convey and understand information that is communicated between participants. Users may be less reluctant to participate in online meetings and video conferences, and online video conferencing technology may gain even more widespread acceptance and relevancy.

FIG. 1 illustrates an example multimedia conference system 100, upon which aspects of this disclosure may be implemented. The system 100 includes a multimedia conference server 102, a plurality of client devices 106a . . . 106n, and a network 109. The system 100 is configured to enable online meetings, video conferences, video calls, multimedia conferences, and/or the like (referred to hereafter as a "multimedia conference") to be performed between a plurality of participants 104a . . . 104n via the plurality of client devices 106a . . . 106n.

The client devices 106a . . . 106n may be personal or handheld computing devices having or being connected to input/output elements that enable a user to interact with multimedia conferencing applications, such as application, and participate in multimedia conferences. Examples of suitable client devices include but are not limited to personal computers, desktop computers, laptop computers, mobile telephones, smart phones, tablets, phablets, smart watches, wearable computers, gaming consoles, televisions; and the like. Client devices 106a . . . 106n are connected to the multimedia conference server 102 via the network 109. Network 109 may include one or more wired/wireless communication links and/or communication networks, such as a PAN (personal area network), a LAN (local area network), a WAN (wide area network), or a combination of networks, such as the Internet.

Multimedia conference server 102 is configured to enable multimedia conferences to be scheduled, established, managed, recorded and controlled over the network. To this end, multimedia conference server 102 includes a multimedia conference management application 110 that provides this functionality and more over the network. In embodiments, the multimedia conference server 102 comprises one or more computing devices, which may be computers, work stations, servers, a server array, server farm, or the like, and one or more data stores, such as data store 107, including data, programmed instructions, and other information that enable multimedia conferences to be implemented.

Client devices 106a . . . 106n include multimedia conferencing applications 112a . . . 112n that enabling participants to connect to, schedule, invite others, and interact with multimedia conference management application 110 of the server 102. During a multimedia conference, multimedia conferencing applications 112a . . . 112n on the client devices generate multimedia streams including live video and audio of the participants. The multimedia conference management application 110 of the server receives the multimedia streams from the client devices 106a . . . 106n and distributes the multimedia conference streams to the client devices 106a . . . 106n via the network 109. The multimedia conferencing applications 112a . . . 112n receives the multimedia conference stream and plays the live video and audio of the participants on the client device.

Figure 2:
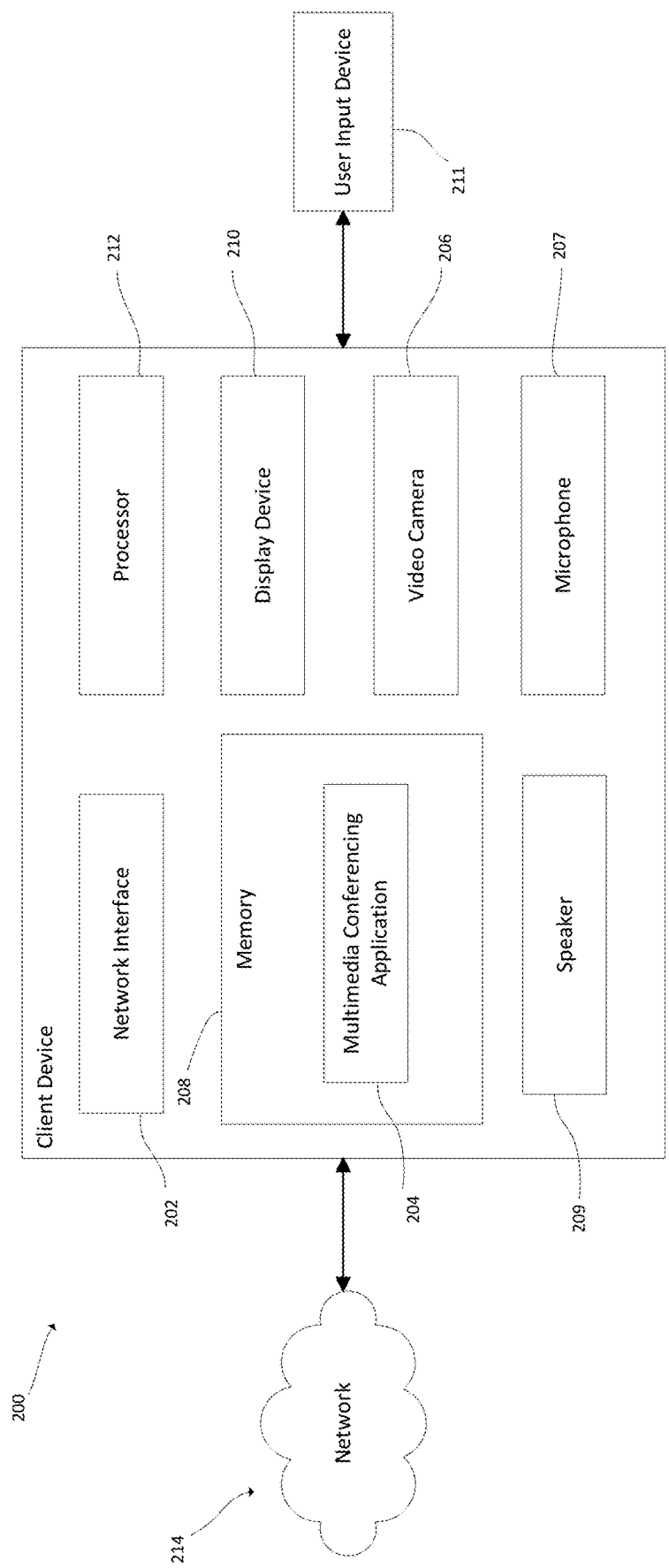
FIG. 2 depicts an example client device including a multimedia conferencing application with eye contact optimization in accordance with this disclosure.

FIG. 2 shows an example of a client device 200 that may be used to implement the client devices 106a . . . 106n of FIG. 1. The client device 200 includes a display device 210, a speaker 209, a video camera 206, a microphone 207, a network interface 202, a memory 208 and a processor 212. The display device 210 is configured to display text, pictures, graphics, video, and the like, as part of the operation of the client device. The display screen 210 may use any suitable technology including LCD, plasma, LED, iOLED, CRT, etc. In embodiments, the display device 210 may be configured as a touch-screen display. The speaker 209 is configured to output sound related to the operation of the client device. The speaker 209 may be integrated into the client device or provided as one or more external components which are connected to the client device. Any suitable type of speaker may be utilized.

The video camera 206 is configured to capture video in the vicinity of the client device 200. Any suitable type of video camera may be used. In embodiments, the video camera 206 may be integrated into the client device or may be provided as an external component which can be operably connected to and disconnected from the client device. The video camera 206 is provided at a predetermined or preselected camera position with respect to the display device. In embodiments, the camera position may be located on or near one of the edges (e.g., top, bottom, or side) of the display screen. The microphone 207 is configured to capture audio in the vicinity of the client device 200. The microphone 207 may be integrated into the client device 200 or provided as an external component. Any suitable type of microphone may be utilized. The network interface 202 enables the client device 200 to connect to network. The network interface 202 may be configured to have a wired (e.g., Ethernet) and/or wireless (e.g., WIFI) connection to the network.

The memory 208 can include non-transitory memory, such as random access memory, read-only memory, or a combination thereof. The processor 212 can include a microprocessor, a microcontroller, a digital signal processor, or any combination thereof configured to execute instructions stored in the memory 208. The memory 208 can also store data used with and generated by execution of the instructions.

As shown in FIG. 2, the memory 208 stores the multimedia conferencing application 204. The application 204, as executed by the processor 212, enables a user to participate in online multimedia conferences. Examples of applications include, but are not limited to, a video conferencing application (e.g., Microsoft Teams), a collaborative work application, and a communications application. The client device 200 includes at least one user input device 211, such as a keyboard, a pointing device (e.g., mouse, trackball, joystick, etc.), a touch screen, a digitizer and stylus, and the like, that enables a user to interact with the operating system and applications on the client device 200.

During a multimedia conference, the application 204 is configured to control/access the video camera 206 to receive live video and control/access the microphone 207 to receive live audio of the user of the client device 200, and to generate a multimedia stream from the live video and live audio that is transmitted via network interface 202 and network 214 to the multimedia conference server 102. In embodiments, the application 204 may be configured to generate the multimedia stream in any suitable format and use any suitable and/or necessary protocols that enables the multimedia stream to be transmitted and processed appropriately by the multimedia conference server. In embodiments, the application 204 is configured to allow the live video and/or audio from the client device to be disabled by the user, e.g., by allowing the user to turn off the camera and microphone.

The application 204 is also configured to receive a multimedia media conference stream from the multimedia media conference server 102 that includes the multimedia streams from the client devices of other participants of the multimedia conference. The application 204 includes a stream processing module for processing the multimedia stream and displaying video from the multimedia stream on the display device 210 and playing audio from the multimedia stream on the speaker 209. In embodiments, the application 204 may be configured to cause a user interface, such as a window, to be displayed on the display device in which the video from the multimedia conference is displayed. In embodiments, the video streams of the participants may be displayed as a gallery with the video stream of each participant being shown in a separate frame or sub-window in the user interface, referred to herein as a video tile.

Figure 3A:
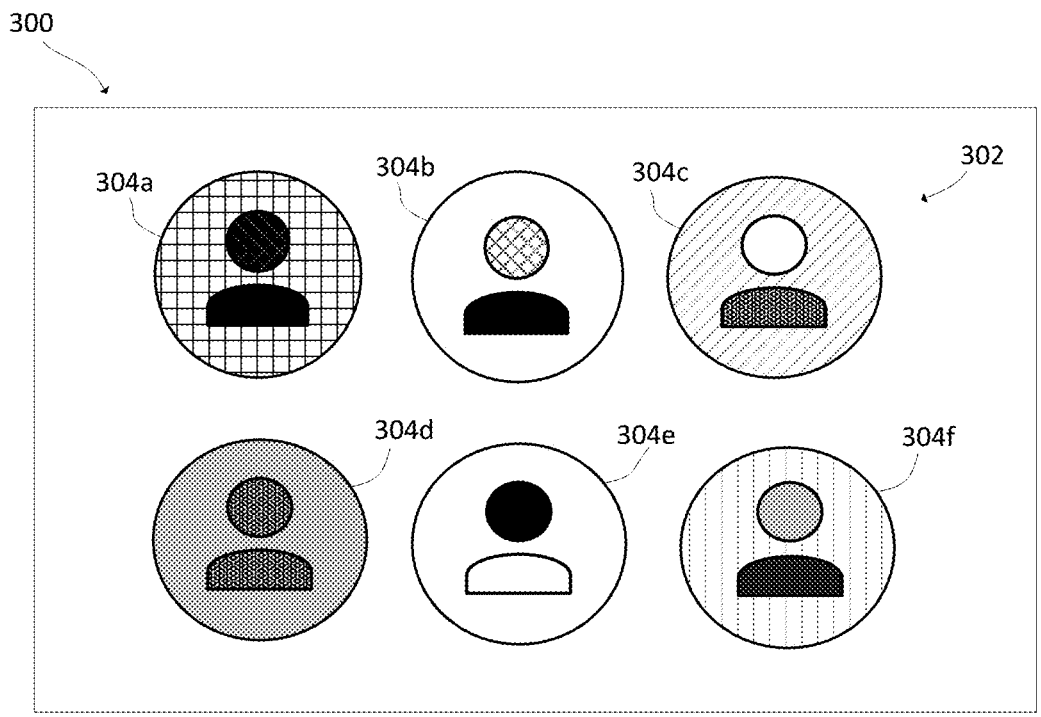
FIGS. 3A-3B show example arrangements of video tiles of participants in a multimedia conference.
Figure 3B:
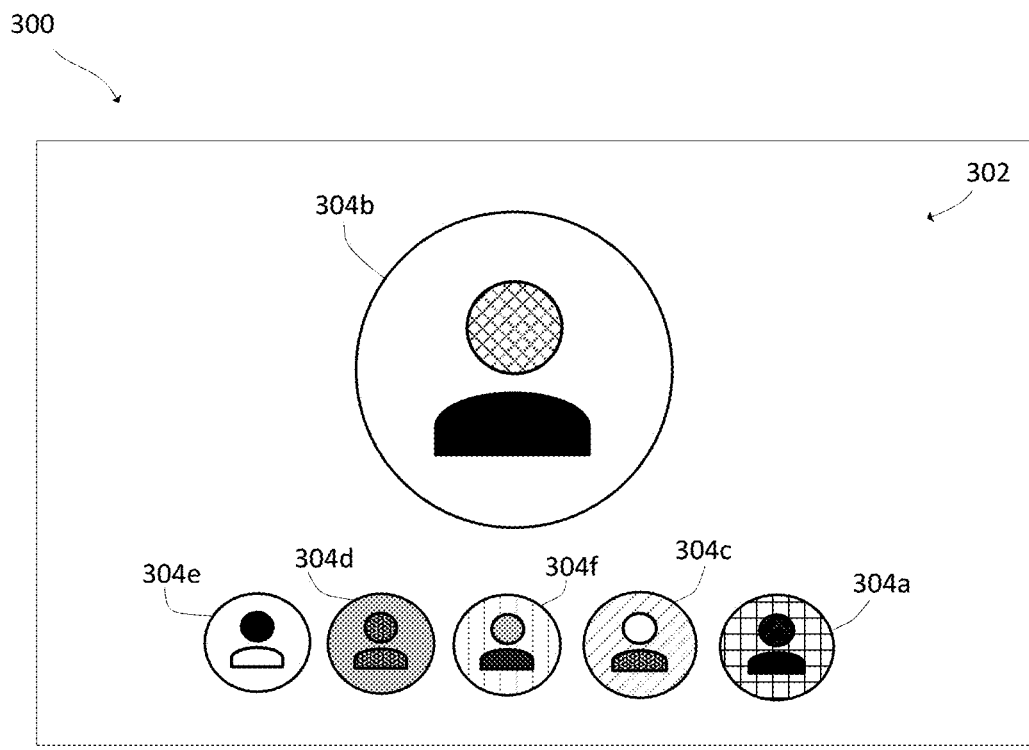

Example user interfaces 300 showing galleries of video tiles 302 are shown in FIGS. 3A and 3B. In FIGS. 3A and 3B, the user interface 300 comprises a window which may be displayed on the screen of the display device. In embodiments, the user interface 300 may be displayed such that it occupies the full screen of the display device or just a portion. The size and position of the window 300 may be controlled by the user of the client device, e.g., using a user input device. The gallery of video tiles 302 shows six video tiles 304a-304f. Each video tile 304a-304f shows the video stream provided by six respective participants of a multimedia conference. The multimedia conferencing application may control the size and shape of the video tiles.

The video tiles 304a-304f may be arranged in the gallery in a number of different ways. In the example of FIG. 3A, the video tiles 304a-304f are arranged in a grid pattern in two rows with all of the tiles being the same size. Another example arrangement of video tiles is shown in FIG. 3B. In FIG. 3B, the video tiles 304a-304f are arranged such that an active participant, e.g., the participant associated with tile 304b, is displayed in a central and upper position within the window 300 and with a larger tile size while inactive participants, e.g., 304a, 304c, 304d, 304e, and 304f, are displayed in a row below the active participant tile 304b. As used herein, the term "active" as in "active participant" refers to a participant or participants that are actively speaking during the multimedia conference. Conversely, the term "inactive" is used to refer to participants who are not speaking as well as participants that are not providing live audio (e.g., the audio stream has been turned off or muted).

An eye contact optimization system that may integrated into or used in conjunction with the multimedia conferencing applications and/or the multimedia conference management application is provided that improves the ability of the multimedia conference system to simulate in-person meetings by facilitating eye contact as well as back-and-forth conversations between participants of multimedia conferences. The eye contact optimization system is configured to analyze the audio and/or video components of the multimedia streams received from the client devices to detect characteristics indicative of two or more participants having a back-and-forth conversation during the multimedia conference, to identify the locations of the cameras for the client devices of the participants in the multimedia conference, and to control the manner in which the videos of the participants having the conversation are displayed on each other's devices (and in some cases the devices of the other participants as well) so it appears that the participants having the conversation are making eye contact with each other during the conversation.

Figure 4:
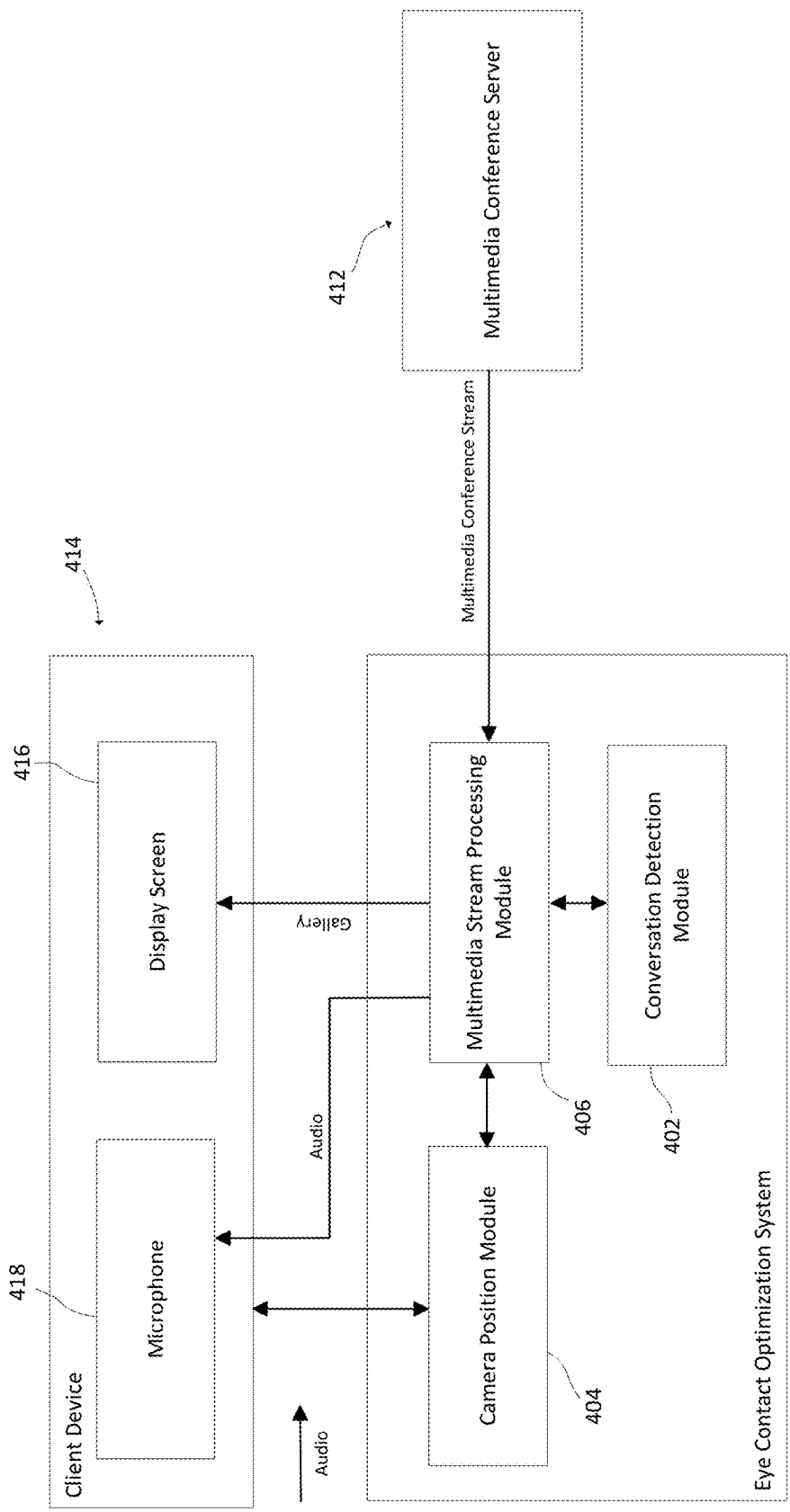
FIG. 4 shows an example eye contact optimization system for use with the multimedia conference system of FIG. 2.

FIG. 4 shows an example implementation of an eye contact optimization system 400 in accordance with this disclosure. The eye contact optimization system 400 includes a conversation detection module 402, a camera position module 404, and a multimedia stream processing module 406. In embodiments, these modules may be implemented in a multimedia conference management application on a multimedia conference server 412 or in the multimedia conferencing application on the client device 414. In some embodiments, the modules may be distributed between the management application and the conferencing applications.

The eye contact optimization system 400 of FIG. 4 is configured to receive the multimedia conference stream including the multimedia streams of each of the participants in a multimedia conference from the multimedia conference server 412. The multimedia streams are supplied to the multimedia stream processing module 406 which is configured to process the streams to generate a user interface, such as user interface 300 of FIGS. 3A and 3B, including a gallery of video tiles for display on the display screen 416 of the client device 414 with each of the video tiles showing the video stream of a different participant in the conference. The multimedia stream processing module 406 is configured to control the size as well as the arrangement of video tiles in the gallery. The multimedia stream processing module 404 is also configured to generate a composite audio stream from the audio streams of the participants which is provided to the speaker 418 for playback in synchronization with the video streams being displayed in the video tiles.

The conversation detection module 402 is configured to analyze the audio and/or the video components of the multimedia streams to detect conversations between two or more participants and to notify the multimedia stream processing module 406 of the conversations and the identity of the participants in the conversations as they occur (discussed in more detail below). The camera position module 404 provides the camera position of the client device 414 to the multimedia stream processing module 406. In response to receiving notification that a conversation between participants has been detected, the multimedia stream processing module 406 may adjust or alter the display of the video tiles on the display screen such that the video tiles associated with the participants in the conversation are moved on the display screen toward the camera position.

In embodiments, the video tiles of the participants are moved to positions which are adjacent to the region of the edge of the display screen that is closest to the camera. The video tiles of the other participants which are not participating in the conversation are arranged in positions which are farther away from the camera than the video tiles of the conversation participants. In embodiments, the multimedia stream processing module 406 is configured to control the position of the video tiles within the user interface. In some embodiments, the multimedia stream processing module 406 may be configured to control the size and position of the user interface on the display screen so as to increase the size and/or move the user interface closer to the camera position as well.

Figure 5A:
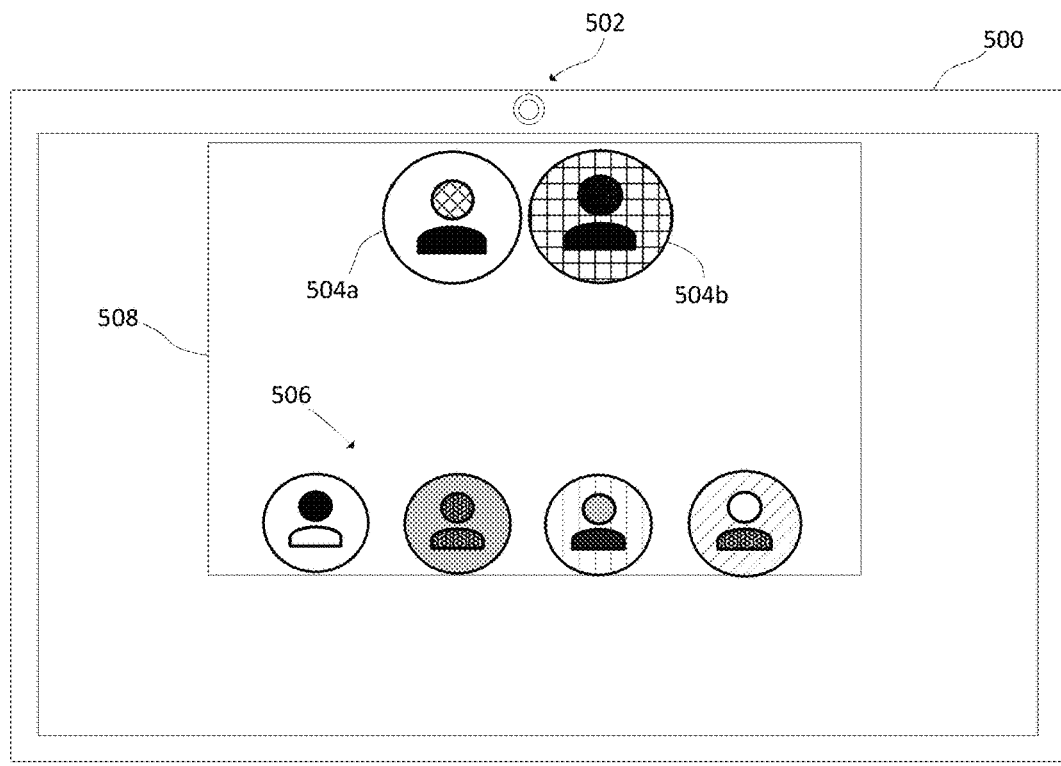
FIGS. 5A-5C show example arrangements of video tiles based on camera position when a conversation is detected by the eye contact optimization system of FIG. 4.
Figure 5B:
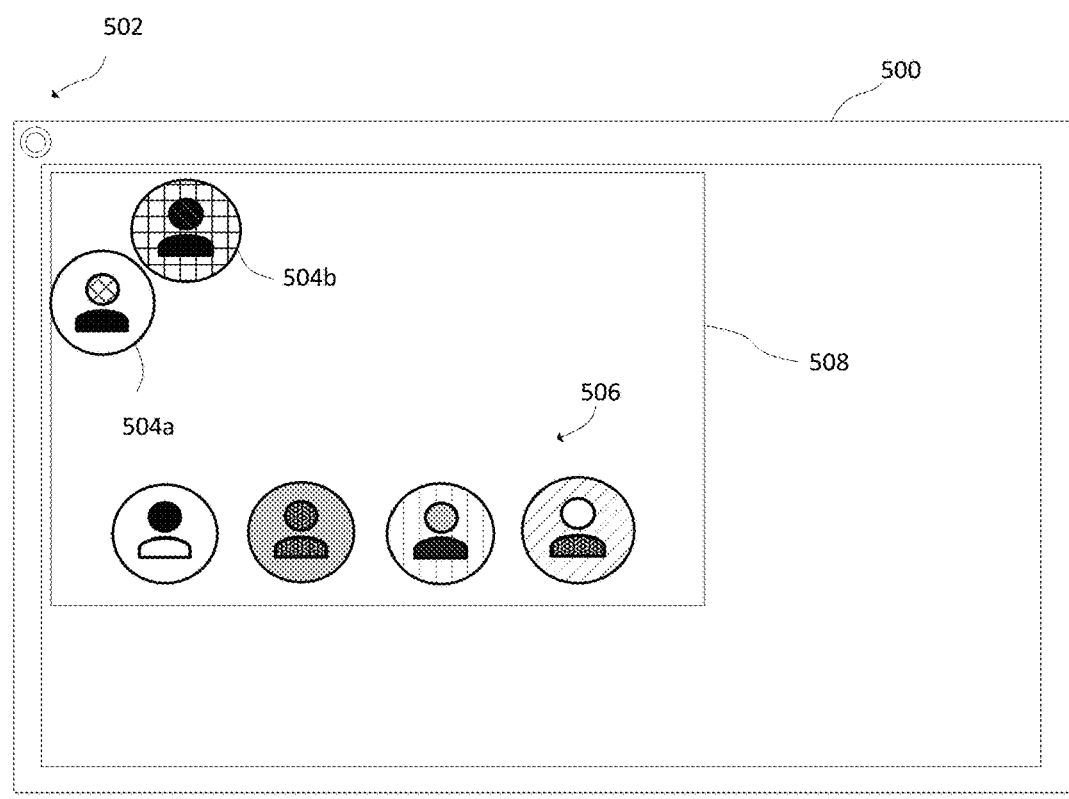
Figure 5C:
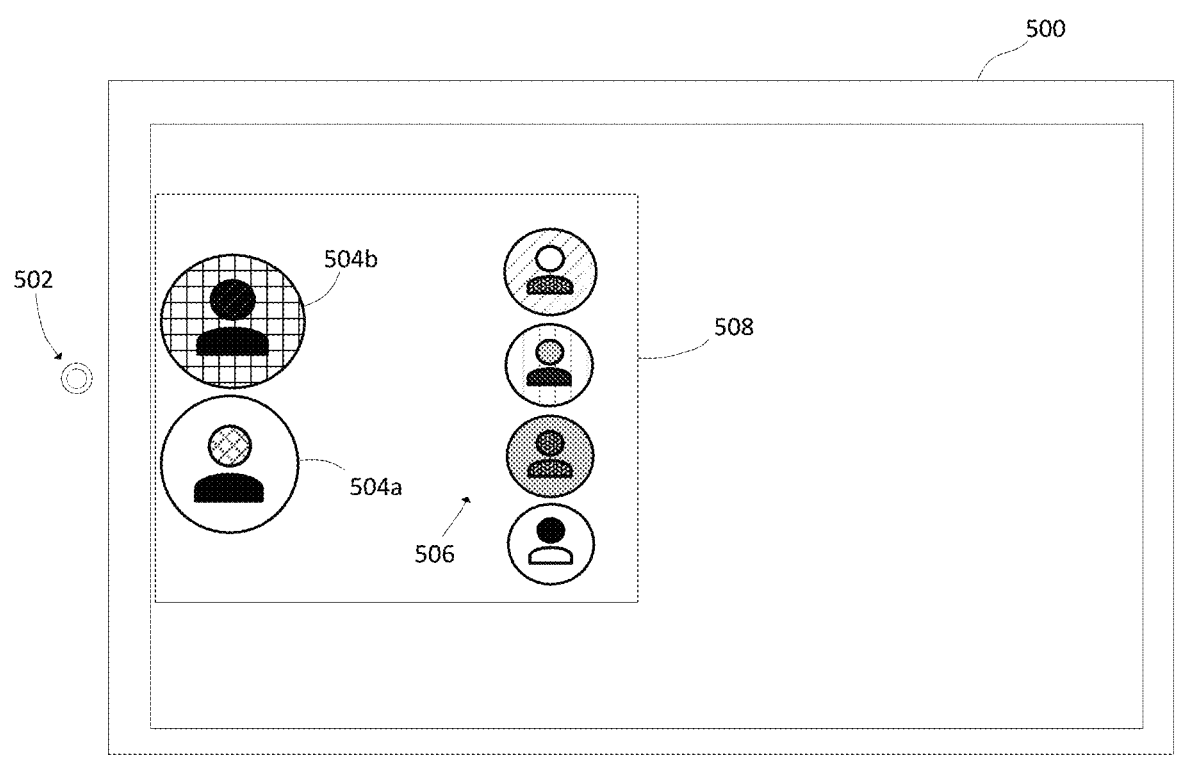

FIGS. 5A-5C show different arrangements of video tiles for different camera positions once a conversation has been detected and the multimedia stream processing module has moved the tiles of the conversation participants closer the camera position. FIG. 5A shows a display screen 500 having a camera position 502 which is located in the center near the top edge of the display screen. The user interface 508 is positioned centered adjacent to the top edge of the display screen, and the video tiles 504a, 504b of the conversation participants have been moved to positions adjacent to the top edge of the user interface and substantially as close to the camera position 502 as possible within the user interface 508 and the display screen 500. The video tiles 506 of the other participants not in the conversation are positioned in a row near the bottom edge of the interface 508.

FIG. 5B shows an example in which the display screen 500 has a camera position 502 which is located near the top left corner of the display screen 500. In this example, the user interface 508 is positioned in the top left region of the display screen, and the video tiles 504a, 504b of the conversation participants have been moved to positions adjacent the top left corner of the interface 508 and substantially as close to the camera position 502 as possible within the user interface 508 and the display screen 500. The video tiles 506 of the other participants not in the conversation are positioned in a column along the right edge of the interface 508.

FIG. 5C shows an example in which the display screen 500 has a camera position 502 which is located along the left edge of the display screen. In this example, the user interface 508 is adjacent to the left side of the display screen, and the video tiles 504a, 504b of the conversation participants have been moved to positions along the left edge of the interface 508 and as close to the camera position 502 as possible within the user interface 508 and the display screen 500.

In embodiments, when the system 400 detects that the user of the client device 414 is a participant in a conversation, the multimedia stream processing module 406 may be configured to only move the tile associated with the other participant(s) in the conversation toward the camera position. The multimedia stream processing component 406 may also be configured to increase the size of the video tile of the other participant(s) on the display screen to further improve the ability of the user to see facial expressions, gestures and other non-verbal cues that can enhance the ability to convey information and promote understanding during a conversation.

When the conversation detection module 402 detects that a conversation has ended or a new conversation has started between a different group of participants, the multimedia stream processing module alters the display accordingly. For example, when a conversation has ended and no new conversation has been detected, the video tiles of the participants may be returned to the positions and arrangements utilized before the conversation was detected, such as depicted in FIGS. 3A and 3B. When a new conversation is detected, the video tiles associated with the participants in the new conversation are moved toward the camera position while the participants in the previous conversation (which are not participants in the new conversation) are moved away from the camera position.

By moving the video tiles of the participants in a conversation as close as possible to the camera, when the participants in the conversation look at a video tile of the other participant in the conversation it appears that the participants are looking at each other and making eye contact with each other during the conversation. The perceived eye contact between conversation participants as well as the perceived eye contact between the other participants and the participants in the conversation promotes user engagement in the video conference which can improve the efficiency of video conferences, make it easier for participants to understand what is being conveyed during conferences, and reduce the amount of time required to convey information during a video conference.

As noted above, the conversation detection module 402 is configured to receive the audio and/or the video components of the multimedia streams of the participant and to process the audio and/or video components detect characteristics indicative of conversations (e.g., back-and-forth interactions). In one implementation, the conversation detection module is configured to detect conversations based on the audio components of the multimedia streams. The conversation detection module is configured to analyze the audio components (e.g., streams) of the participants to identify speech characteristics indicative of two or more participants actively having a conversation with each other. One example of a speech characteristic that may be used to detect conversations is sequences or patterns of speaking in which two or more of the same participants are speaking in an alternating manner, e.g., back-and-forth.

In embodiments, sequences and patterns in speaking may be identified using a speaker diarization algorithm. Speaker diarization refers to the process of partitioning an input audio stream into homogeneous segments according to speaker identity. A speaker diarization algorithm may be used to identify which participants have spoken when they have spoken in relation to each other. This in turn enables the sequence in which the participants speak during a conference to be monitored to detect patterns of speaking indicative of conversations, such as alternating patterns in which two or more of the same participants speak one after the other.

In some implementations, the conversation detection module 402 may be configured to detect conversations based on analysis of the video components of the streams of the participants to detect visual characteristics of the participants that may be indicative of a conversation taking place. For example, the conversation detection module may be configured to analyze video streams of participants using eye tracking techniques to determine when the gazes of participants appear to be switching between the same two locations on the screen in an alternating manner. In embodiments, eye tracking techniques may be used to determine the gaze direction of the participants which in turn may be used to determine where each participant is looking at on their display screen. When a participant's gaze appears to switch between two positions on the display screen corresponding to the video tiles of two participants of the conference, this may be used as an indication that a conversation is taking place between the two participants. In embodiments, the conversation detection module 402 may be configured to detect conversations in this manner based on a threshold value. For example, the conversation detection module may be configured to detect a conversation when the gazes of a predetermined amount of the participants, e.g., all, a majority, 75%, etc., appear to be switching back and forth between the same two participants.

In some implementations, the conversation detection module 402 is configured to analyze video streams in conjunction with audio streams of the participants to identify when a conversation is taking place, to identify the participants in the conversation, and/or to confirm the occurrence of a conversation. For example, when the video streams indicate that the gazes of participants are switching between two locations on the display screen, the audio streams may be analyzed to determine which participants are speaking when the gazes of the participants are focused on the two locations on the display screen. This information may be used to confirm the occurrence of a conversation as well as to verify the identity of the participants in the conversation.

Figure 6A:
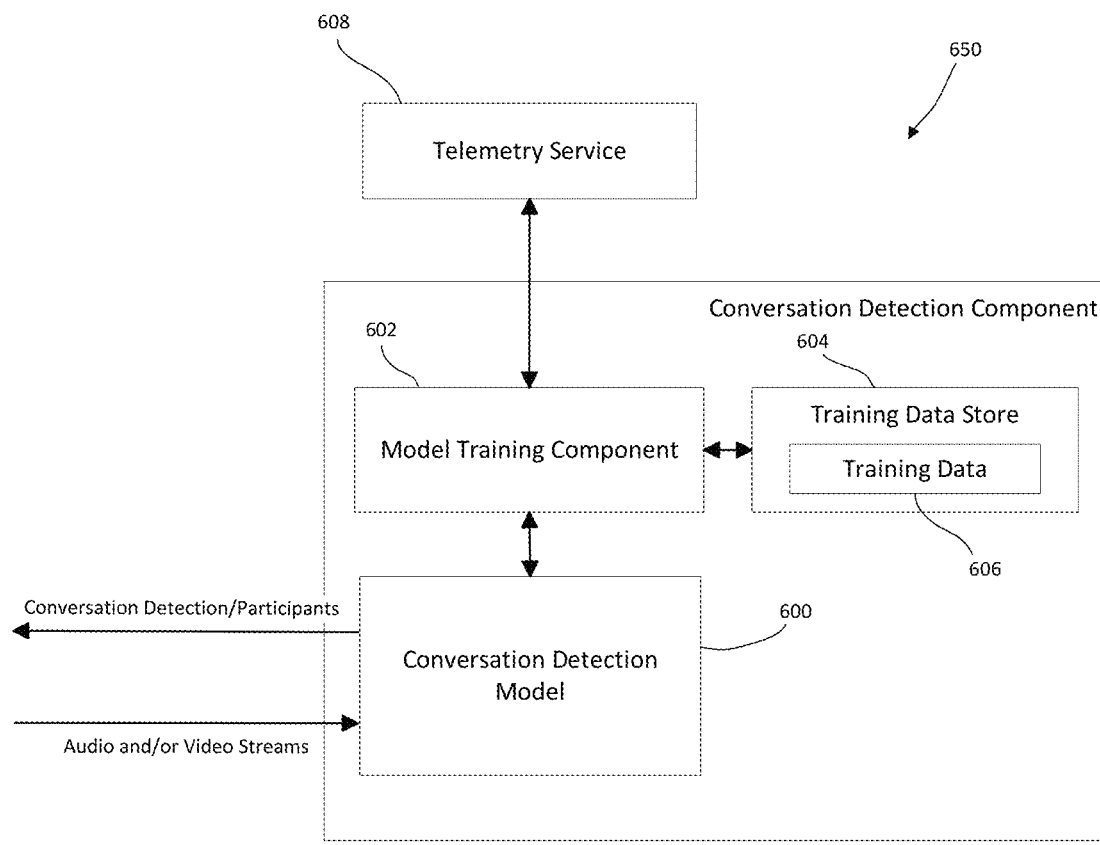
FIG. 6A shows an example implementation of the conversation detection module of the eye contact optimization system of FIG. 4.

An example implementation of a conversation detection module 650 is shown in FIG. 6A. In embodiments, the conversation detection module 650 may include a conversation detection model 600 that is configured to receive the audio and/or video components of the multimedia streams of the participants as input and is trained to analyze the audio and/or video components to identify speech and/or visual characteristics in the audio and/or video components indicative of conversations occurring during a multimedia conference. The conversation detection model 600 is configured to provide outputs indicating when conversations are detected as well as the participants in the conversation. The conversation detection model 600 is configured to process the audio and/or video components to detect conversations as the audio and/or video components are received so that conversations are detected in real-time as they occur.

In embodiments, the conversation detection module includes a model training component 602 that is configured to train the conversation detection model using training data 606 stored in a training data store 604 to provide initial and ongoing training for the conversation detection model 600. To train a conversation detection model 600 to detect conversations based on audio streams of participants, the conversation detection model 600 is trained to detect and/or recognize human speech and to identify speech and/or speaking characteristics indicative of conversations, such as alternating sequences of speaking by the same two participants. To this end, the training data for the model 600 includes samples of audio of people having conversations. The conversation detection model 600 is trained to learn rules for detecting conversations based on the training data and to apply these rules to the audio streams of participants in a multimedia conference to detect conversations.

To train a conversation detection model 600 to detect conversations based on video streams of participants, the conversation detection model is trained to identify visual characteristics in the video streams indicative of conversations between participants. Visual characteristics may comprise the gazes of participants switching between two video tiles on the display screen of the client devices. To this end, the conversation detection model is trained to process the video streams using eye tracking techniques to monitor where the participants are looking on the display screens. In embodiments, the training data for training the model to detect conversations based on video streams includes samples of video showing people viewing a multimedia conference on a display screen. The conversation detection model 600 is trained to learn rules for detecting conversations based on the training data and to apply these rules to the video streams of participants in a multimedia conference to detect conversations.

In embodiments, the conversation detection model 600 may be trained to analyze audio streams of participants in conjunction with video streams of participants to detect audio and/or visual characteristics that may be used to detect conversation and/or confirm the occurrence of conversations. Alternatively, separate models may be trained to analyze audio streams and video streams to detect conversations. In embodiments, the output of the separate models may be provided to another model that is trained to detect conversations based on a combination of the audio and video characteristics identified by the separate models.

In embodiments, training data may be derived in part from telemetry data corresponding to user feedback and usage of the conversation detection module. The telemetry data may be used to reinforce learning and/or adjust the training data based on the performance of the model. Telemetry data may be received from a telemetry service 608.

Conversation detection models may use any suitable machine learning algorithm (MLA) for detecting conversations, including, for example, decision trees, random decision forests, neural networks, deep learning (for example, convolutional neural networks), support vector machines, regression (for example, support vector regression, Bayesian linear regression, or Gaussian process regression). The training component may include and/or have access to substantial computation resources for training, such as a cloud, including many computer server systems adapted for machine learning training. In some implementations, the training component is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In embodiments, when the conversation detection model 600 detects a conversation, the model generates an output that notifies the multimedia stream processing module 406 that a conversation is occurring and indicates the participants in the conversation. The multimedia stream processing module 406 then alters the display of the video tiles as described above such that the video tiles associated with the participants in the conversation are moved on the display screen toward the camera position.

In embodiments, the conversation detection module 650 may be configured to eliminate participants from consideration as having a conversation that are not providing audio and/or video for the multimedia conference. For example, a participant muting the audio and/or disabling the camera of their device may be used as an indication that the user is not participating in a conversation. This is especially true when a participant is not providing audio which indicates either that the participant does not want to participate in conversation or is not capable of participating (e.g., does not have a microphone). The conversation detection module 402 may exclude the feeds of these participants from being provided to the conversation detection model 600 as input. In some cases, a participant that is not providing video may still be considered as an active participant in a conversation based on the audio stream from the participant. Even though eye contact optimization will not benefit this participant, the video tile associated with the participant (which in this case would typically show a graphic, such as an icon and/or initial, in place of the video stream of the participant) may still be moved to toward the camera position to indicate which of the participants are currently having a conversation.

In some implementations, the conversation detection model 600 is also trained to detect when conversations end. In embodiments, the end of a conversation may be detected when one or both of the participants in a conversation do not speak for a predetermined amount of time, or when a new conversation between different participants is detected before the previous conversation has ended. In response to detecting the end of a conversation, the conversation detection model 600 generates an output notifying the multimedia stream processing module that the conversation has ended. The multimedia stream processing module may then return the video tiles to the positioning and arrangement that was utilized before the conversation was detected, as discussed above. When a new conversation is detected before the end of the previous conversation has been detected, the multimedia stream processing module is configured to replace the video tiles of the participants of the previous conversation with the video tiles of the participants of the new conversation. The video tiles of the previous participants may be returned to their initial positions on the display screen.

Referring again to FIG. 4, the camera position module 404 is used to provide the camera position of the client device 414 to the multimedia stream processing module 406. The camera position module 404 may be configured to identify the camera position in a number of ways. In embodiments in which the video camera is integrated into the client device as a built-in camera, the camera position module 404 may be configured to identify the camera position by requesting the camera position information from the client device 414. In some embodiments, the camera position module 404 is configured to determine the type and/or model of the client device and to access a specification for the type and/or model to determine the camera position. In embodiments, the specification may be obtained from a memory accessible by the camera position module 404 or obtained from a remote location, such as a website or other data repository, via a network.

Figure 6B:
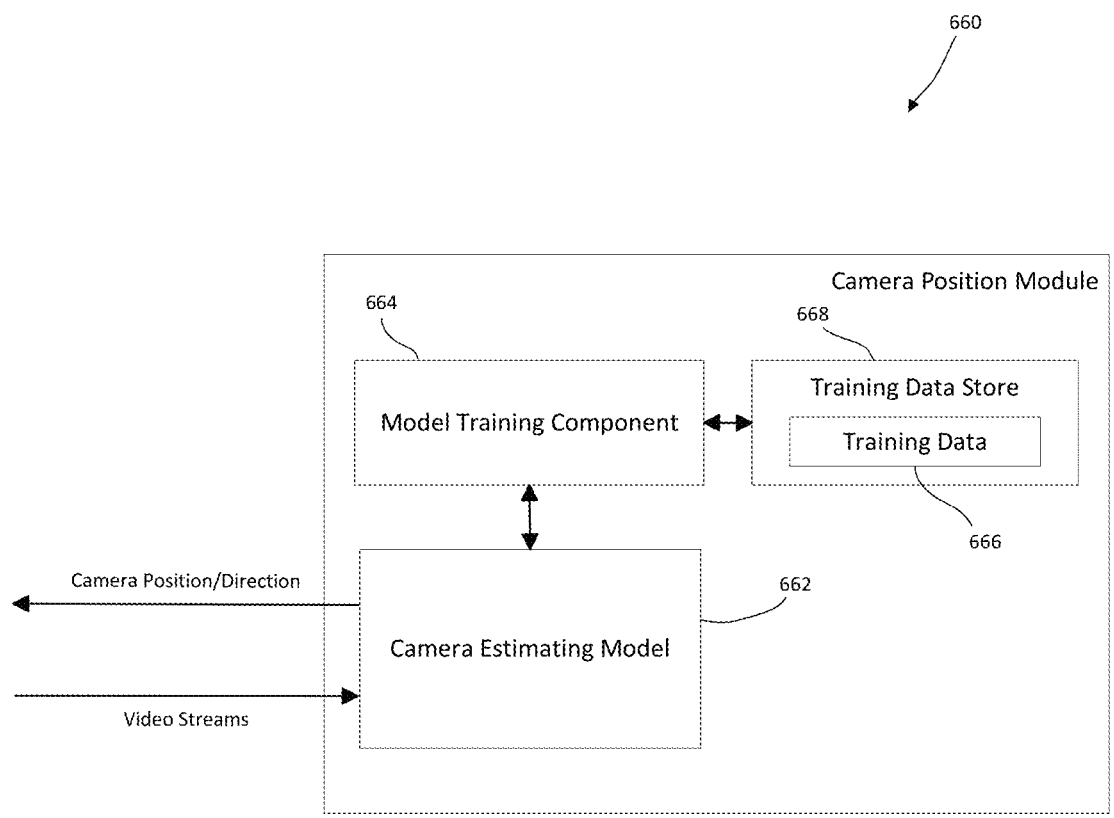
FIG. 6B shows an example implementation of the camera position module of the eye contact optimization system of FIG. 4.

An example implementation of a camera position module for automatically detecting a camera position and/or direction of a camera on a client device is shown in FIG. 6B. In embodiments, the camera position module 660 may include a camera detection model 662 that is configured to receive the video components of the multimedia streams of the participants as input and is trained to analyze the video components using one or more of a eye tracking algorithm, face track algorithm, head tracking algorithm, head-pose estimation algorithm, gaze estimation algorithm, and the like to detect visual characteristics of participants indicative of the participants looking at the display screen, and in particular, at a center of the display screen, and to estimate a camera position and/or direction based on the detected visual characteristics. As an example, the camera detection model may be configured to track the head orientation and/or gaze direction of a participant over time and to determine an average head orientation and/or gaze direction which can be used as the estimate for the head orientation when looking at the central region of the display screen. The camera position/direction can then be estimated based on the determined head orientation and/or gaze direction.

Figure 6C:
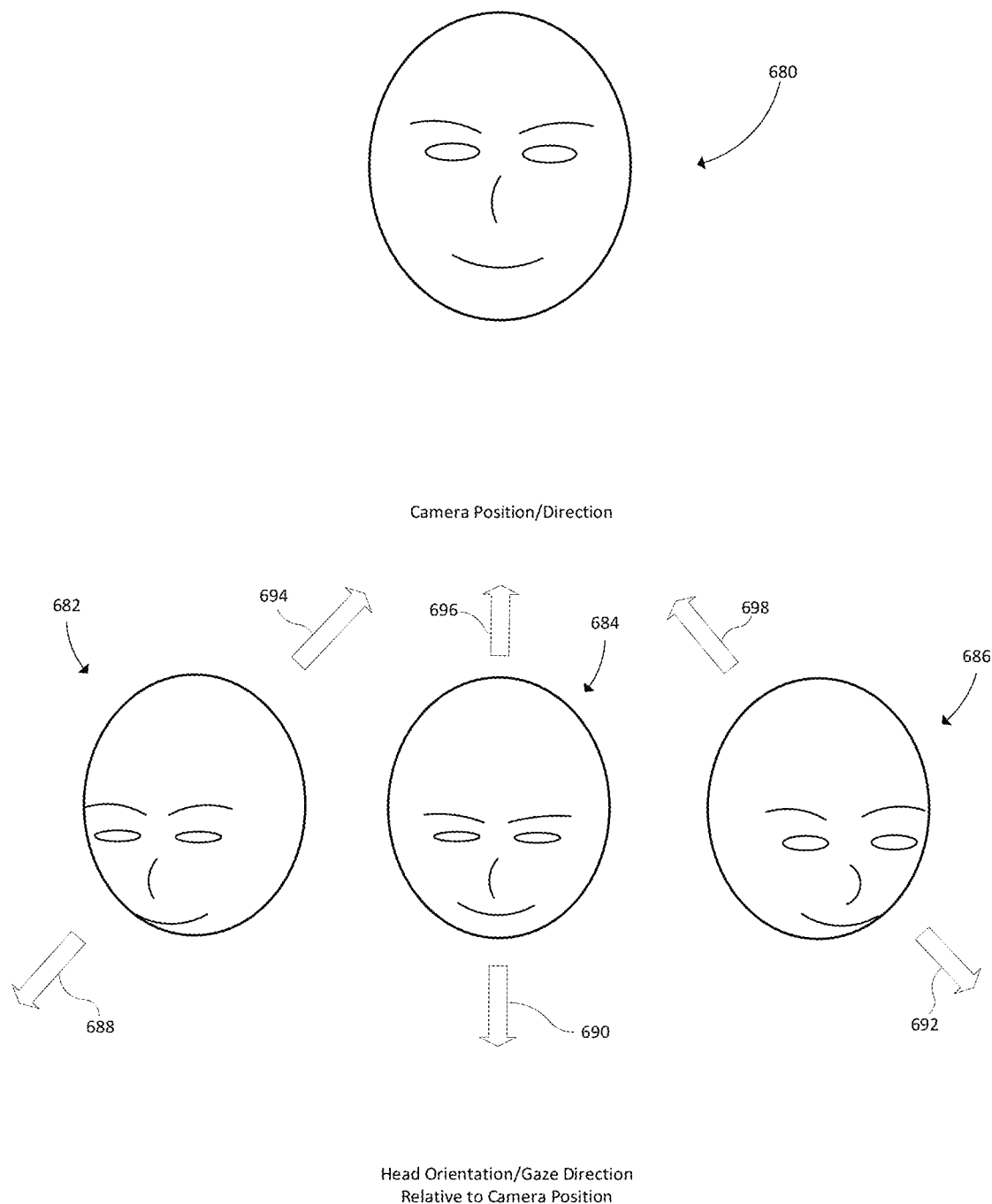
FIG. 6C shows illustrations of the relation between head orientation/gaze direction and camera position/direction.

FIG. 6C shows illustrations of a faces 680, 682, 684, 686 in relation to view/camera angle. The face 680 is shown looking straight ahead, i.e., straight at the camera. The face 682 is oriented in a direction 688 down and to the right in relation to the view/camera angle. The face 684 is oriented in a direction 690 that is down and centered in relation to the view/camera angle. The face 686 is oriented in a direction 692 that is down and to the left in relation to the view/camera angle. Algorithms and signal processing techniques are known that can enable the estimation of the head orientation and/or gaze direction from video images. Detecting the head orientation and/or gaze direction in turn enables the camera position/direction to be estimated. For example, in FIG. 6C, the camera position/directions 694, 696, 698 are substantially the opposite to the directions 688, 690, 692, respectively, that the faces are oriented relative to the view/camera angle. In embodiments, the camera detection model 662 may be trained to analyze videos of participants and estimate a head orientation and/or gaze direction indicative of a participant looking at the display screen, then to estimate the camera position/direction based on the estimated head orientation and/or gaze direction, and to provide the camera position/direction as an output.

Referring to FIG. 6B, the camera detection model 662 includes a model training component 664 that is configured to train the camera detection model 662 using training data 666 stored in a training data store 668 to provide initial and ongoing training for the camera detection model 662. To train a camera detection model 662 to estimate camera positions/directions based on video streams of participants, the camera detection model 662 is trained to detect faces and to identify speech and/or speaking characteristics indicative of conversations, such as alternating sequences of speaking by the same two participants. To this end, the training data for the model 662 includes samples of audio of people having conversations. The camera detection model 662 is trained to learn rules for estimating a head orientation and/or gaze direction indicative of a participant looking at a display screen and then to determine a camera position/direction based on the estimated head orientation and/or gaze direction.

In embodiments, the camera position module 404 may be configured to implement a calibration process to determine a camera position for a client device. This is particularly useful in situations where the video camera is provided as a separate, external component for the client device. A calibration process involves requesting and receiving some kind of input and/or interaction from a user associated with the client device that can be used to directly or indirectly determine the camera position for the client device. As one example, a calibration process may involve displaying a visual indicator, such as an image of a video tile or an object that resembles a video tile, on a display screen and prompting the user to move the visual indicator with a user input device, such as a mouse, toward the camera. As another example, the calibration process may prompt the user to look at a visual indicator while the visual indicator is moved in a direction that brings the user's gaze toward the camera. In either case, the visual indicator may be moved toward the camera to the extent possible within the display screen. The final position of the visual indicator may then be used as an approximation of the camera position for the device. As another example, a calibration process may involve displaying in image representing the display screen (e.g., such as a square or rectangle, and prompting the user to select a position (e.g., using a mouse) in relation to the image of the display screen where the camera is located.

In some implementations, the camera position module 404 may be configured to determine/estimate camera positions for client devices automatically without prompting a user for a specific type of input/interaction. In embodiments, the camera position module may be configured to determine camera positions by analyzing video images of the user of the client device to detect visual characteristics indicating that the user is looking at the camera. As one example, the camera position module 404 may be configured to detect visual characteristics indicative of the user's face being oriented directly toward the camera based, such as the shape of the face, and/or the position of the features of the face, such as the eyes, nose and mouth, in relation to the overall shape of the face. As another example, the camera position module 404 may be configured to detect visual characteristics of the eyes being focused on the camera such as the irises and/or pupils being circular in shape with the pupils being centered in the irises.

Figure 7:
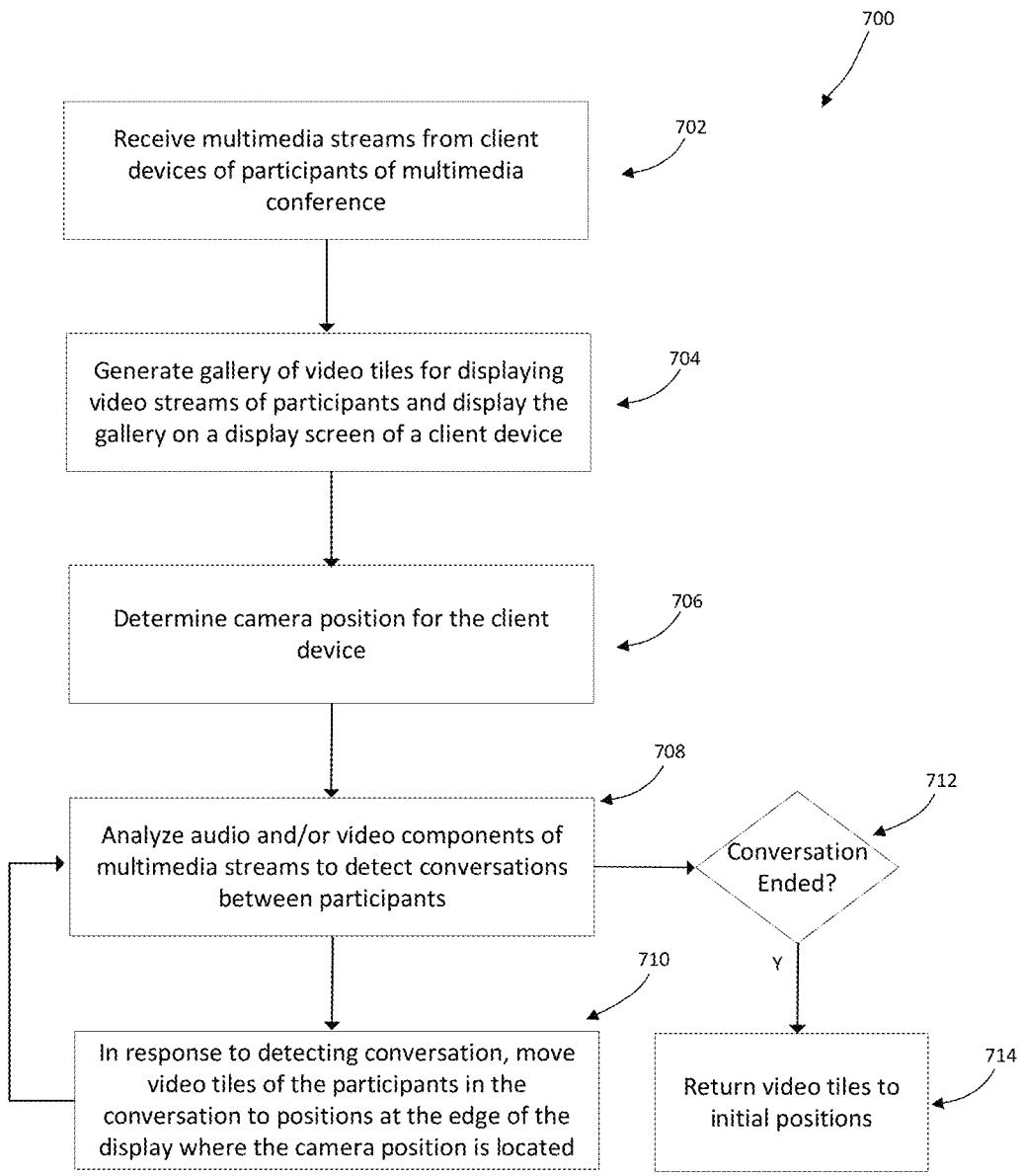
FIG. 7 is a flowchart of a method for conducting a video conference that utilizes the eye contact optimization system of FIG. 4.

FIG. 7 is a flowchart of an example method 700 for conducting a video conference with a plurality of participants that utilizes an eye contact optimization system in accordance with this disclosure. The method 700 begins with receiving the multimedia streams from the client devices associated with the participants in the video conference (block 702). The multimedia streams include both audio and video components. The multimedia stream processing module generates a gallery of video tiles from the video components of the multimedia streams that is displayed on a display screen of a client device (block 704). Each of the video tiles is used to display the video component from one of the participants in the video conference. A camera position for a camera of the client device is determined (block 706), e.g., by a camera position module.

The audio and/or the video components of the multimedia streams are analyzed by a conversation detection module to detect characteristics indicative of a first participant and a second participant having a conversation (block 708). In response to a conversation between a first participant and a second participant being detected, the display of the video tiles associated with the first participant and the second participant are moved on the display screen of the client device toward the camera position and to positions at which the video tiles are adjacent an edge of the display screen where the camera position is located (block 710). Control then returns to block 708 as the audio and/or video components of the multimedia streams continue to be monitored to detect conversations. The streams are also monitored to detect ends of conversations (block 712). When the end of the current conversation is detected without a new conversation being detected, the video tiles of the first and second participants may be returned to their initial positions on the display screen (block 714). When a new conversation is detected before the end of the current conversation has been detected, the video tiles of the participants of the new conversation may be moved toward the camera position to the positions at which the video tiles are adjacent the edge of the display screen where the camera position is located and the video tiles of the previous conversation participants may be returned to their previous positions on the display screen.

Figure 8:
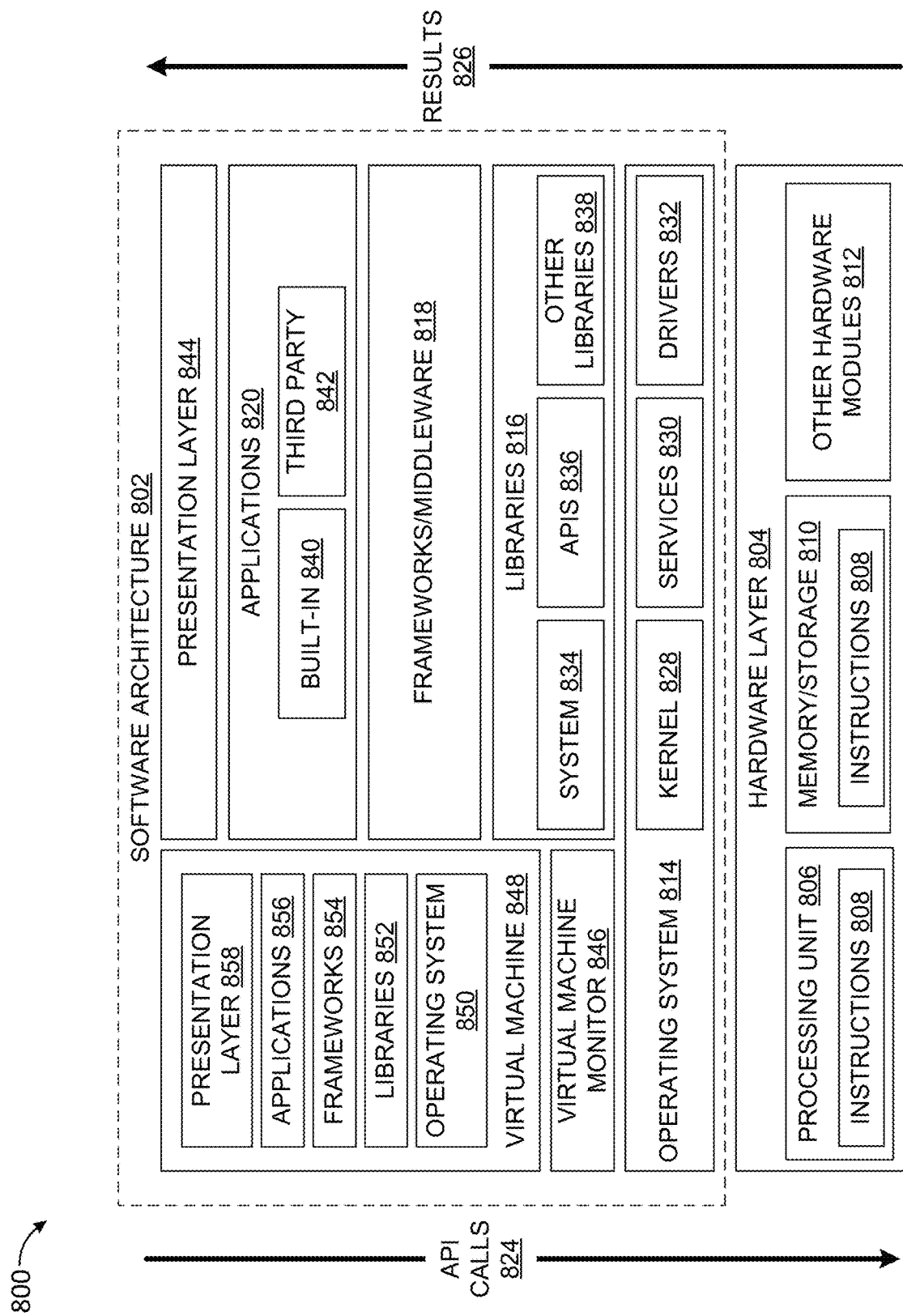
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
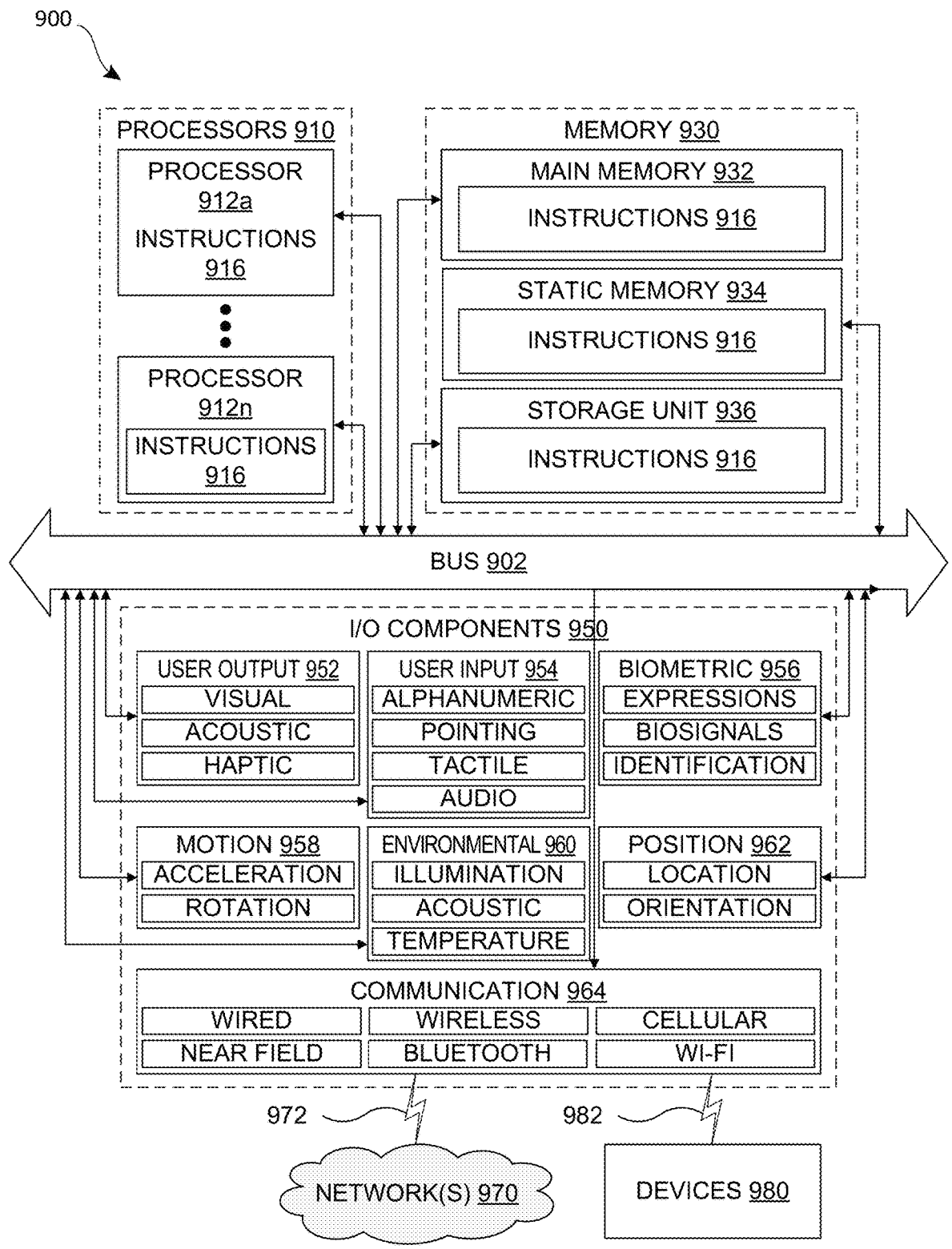
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A method for conducting a videoconference with a plurality of participants, each of the participants utilizing a device for transmitting a multimedia feed of a participant associated with the device and receiving multimedia feeds from devices associated with other participants in the video conference, the method comprising:
  receiving the multimedia feeds from the plurality of devices associated with each of the participants in the videoconference, the multimedia feeds including an audio component and a video component;
  displaying tiles on a display screen of the device of each of the participants, each of the tiles showing the video component of one of the multimedia feeds, respectively;
  analyzing at least one of the audio component and the video component of a plurality of the multimedia feeds to detect characteristics indicative of a first participant and a second participant having a first conversation with each other;
  identifying a first camera position for a camera on a device of the first participant and a second camera position for a camera on a device of the second participant;
  responsive to the identifying that the first participant and the second participant are having the first conversation with each other:
    moving a tile for the first participant on a display screen of the device of the second participant from a first location to a second location, the second location being closer to the second camera position than the first location; and
    moving a tile for the second participant on a display screen of the device of the first participant from a third location to a fourth location, the fourth location being closer to the first camera position than the third location.

Item 2. The method of item 1, wherein analyzing the at least one of the audio component and the video component of each of the multimedia feeds further comprises:
  analyzing the video components of the multimedia feeds to detect characteristics indicative of the tiles the participants are looking at on the display screen of their respective devices.

Item 3. The method of any of items 1-2, further comprising:
  detecting when the video components of the multimedia feeds indicate that gazes of the participants are switching predominately between a first tile and a second tile on the display screen of their respective devices; and identifying the first participant as the participant associated with the first tile and the second participant as the participant associated with the second tile.

Item 4. The method of any of items 1-3, wherein the detecting further comprises:
  determining tile locations for each of the tiles on each of the display devices of the participants; and
  analyzing the video components of the multimedia feeds to identify which of the tile locations the respective participants are looking at.

Item 5. The method of any of items 1-4, wherein analyzing the at least one of the audio component or the video component of each of the multimedia feeds further comprises:
  analyzing the audio components of the multimedia feeds to detect speech characteristics indicative of two participants having the conversation;
  identifying the two participants as the first participant and the second participant based on the speech characteristics.

Item 6. The method of any of items 1-5, wherein the speech characteristics include the two participants speaking in an alternating manner.

Item 7. The method of any of items 1-6, further comprising:
  analyzing the at least one of the audio component and the video component of each of the multimedia feeds to detect characteristics indicative of the first participant and a third participant having a second conversation after the first conversation;
  identifying a third camera position for a camera on a device of the third participant;
  responsive to the identifying that the first participant and the third participant are having the second conversation:
  moving a tile for the first participant on a display screen of the device of the third participant from a fifth location to a sixth location, the sixth location being closer to the third camera position than the fifth location; and
  replacing the tile of the second participant at the second location with a tile for the third participant.

Item 8. The method of any of items 1-7, wherein identifying the first camera position further comprises:
  analyzing the video component of the multimedia feed of the first participant using at least one of an eye tracking algorithm, a face tracking algorithm, and a head tracking algorithm to determine a head orientation of the first participant indicative of the first participant looking at the display screen; and
  estimating the first camera position based on the head orientation.

Item 9. The method of any of items 1-8, wherein identifying the first camera position further comprises:
  analyzing the video component of the multimedia feed of the first participant using at least one of an eye tracking algorithm, a face tracking algorithm, and a head tracking algorithm to identify when the first participant is looking at the display screen and when the first participant is looking at the camera;
  determining a first gaze direction for when the first participant is looking at the display screen and a second gaze direction for when the first participant is looking at the camera; and
  estimating the first camera position based on a comparison of the first gaze direction and the second gaze direction.

Item 10. The method of any of items 1-9, wherein identifying the first camera position further comprises:
  displaying a visual representation of the display screen; and
  receiving a user input indicating a location of the camera with respect to the visual representation; and
  setting the location as the first camera position.

Item 11. The method of any of items 1-10, wherein identifying the first camera position further comprises:
  displaying a camera position indicator on the display screen;
  receiving a user input which causes the camera position indicator to move from a first position to a second position, the second position being closer to the camera than the first position; and
  setting the second position as the first camera position.

Item 12. A data processing system comprising:
  a processor;
  a memory in communication with the processor, the memory comprising executable instructions that, when executed by the processor, cause the data processing system to perform functions of:
  receiving multimedia streams of a plurality of participants in a multimedia conference, the multimedia streams including audio components and video components;
  displaying video tiles on a display screen of a device of at least one of the participants, each of the video tiles showing the video component of one of the multimedia streams;
  analyzing the audio components and/or the video components of the multimedia streams to detect characteristics indicative of a first participant and a second participant having a first conversation with each other;
  identifying a camera position for a camera of the device; and
  responsive to the identifying that the first participant and the second participant are having the first conversation with each other, moving a video tile for the first participant and a video tile for the second participant to an edge of the display screen in a direction of the camera position.

Item 13. The data processing system of item 12, wherein analyzing the audio components and/or the video components of each of the multimedia feeds further comprises:
  analyzing the video components of the multimedia feeds to detect visual characteristics indicative of participants having conversations.

Item 14. The data processing system of any of items 12-13, wherein the functions further comprise:
  analyzing the video components to detect when gazes of participants switch between a location of a first video tile and a second video tile; and
  identifying the first participant as the participant associated with the first video tile and the second participant as the participant associated with the second video tile.

Item 15. The data processing system of any of items 12-14, wherein analyzing the video components to detect gazes of participants further comprises:
  using eye tracking methods to determine gaze directions of the participants in the video components of the multimedia streams; and
  identifying the first video tile and the second video tile based on the gaze directions of the participants.

Item 16. The data processing system of any of items 12-15, wherein analyzing the audio components and/or the video components of the multimedia streams further comprises:

analyzing the audio components of the multimedia streams to detect speech characteristics indicative of two participants having the conversation;

identifying the two participants as the first participant and the second participant based on the speech characteristics.

Item 17. The data processing system of any of items 12-16, wherein the speech characteristics include the two participants speaking in an alternating manner.

Item 18. A non-transitory computer readable medium on which are stored instructions that, when executed, cause a programmable device to perform functions of:

receiving multimedia streams of a plurality of participants in a multimedia conference, the multimedia streams including audio components and video components;

displaying video tiles on a display screen of a device of at least one of the participants, each of the video tiles showing the video component of one of the multimedia streams;

analyzing the audio components and/or the video components of the multimedia streams to detect characteristics indicative of a first participant and a second participant having a first conversation with each other;

identifying a camera position for a camera of the device;

responsive to the identifying that the first participant and the second participant are having the first conversation with each other:

moving a video tile for the first participant and a video tile for the second participant to an edge of the display screen in a direction of the camera position.

Item 19. The non-transitory computer readable medium of item 18, wherein the functions further comprise:

analyzing the audio components and/or the video components of the multimedia streams to detect the first participant and a third participant having a second conversation after the first conversation;

responsive to identifying that the first participant and the third participant having the second conversation:

replacing the second video tile of the second participant with a third video tile of the third participant; and returning the second video tile to a previous position on the display screen.

Item 20. The non-transitory computer readable medium of any of items 18-19, wherein identifying the camera position further comprises:

performing a calibration process on the device in which a user of the device is prompted to provide input indicative of the camera position.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for conducting a videoconference with a plurality of participants, each of the participants utilizing a device for transmitting a multimedia feed of a participant associated with the device and receiving multimedia feeds from devices associated with other participants in the videoconference, the method comprising:

receiving the multimedia feeds from the plurality of devices associated with each of the participants in the videoconference, the multimedia feeds including an audio component and a video component;

displaying tiles on a display screen of the device of each of the participants, each of the tiles showing the video component of one of the multimedia feeds, respectively;

analyzing at least one of the audio component and the video component of a plurality of the multimedia feeds to detect characteristics indicative of a first participant and a second participant having a first conversation with each other;

identifying a first camera position for a camera on a device of the first participant and a second camera position for a camera on a device of the second participant; and responsive to identifying that the first participant and the second participant are having the first conversation with each other:
moving a first tile for the first participant on a display screen of the device of the second participant from a first location to a second location, the second location being closer to the second camera position than the first location; and
moving a second tile for the second participant on a display screen of the device of the first participant from a third location to a fourth location, the fourth location being closer to the first camera position than the third location.

2. The method of claim 1, wherein analyzing the at least one of the audio component and the video component of each of the multimedia feeds further comprises:
analyzing the video component of the multimedia feeds to detect characteristics indicative of the tiles the participants are looking at on the display screen of their respective devices.

3. The method of claim 2, further comprising:
detecting when the video component of the multimedia feeds indicate that gazes of the participants are switching predominately between a first tile and a second tile on the display screen of their respective devices; and
identifying the first participant as the participant associated with the first tile and the second participant as the participant associated with the second tile.

4. The method of claim 3, wherein the detecting further comprises:
determining tile locations for each of the tiles on the display screen of each of the participants; and
analyzing the video component of the multimedia feeds to identify which of the tile locations the respective participants are looking at.

5. The method of claim 1, wherein analyzing the at least one of the audio component or the video component of each of the multimedia feeds further comprises:
analyzing the audio component of the multimedia feeds to detect speech characteristics indicative of two participants having the first conversation; and
identifying the two participants as the first participant and the second participant based on the speech characteristics.

6. The method of claim 5, wherein the speech characteristics include the two participants speaking in an alternating manner.

7. The method of claim 1, further comprising:
analyzing the at least one of the audio component and the video component of each of the multimedia feeds to detect characteristics indicative of the first participant and a third participant having a second conversation after the first conversation;
identifying a third camera position for a camera on a device of the third participant;
responsive to identifying that the first participant and the third participant are having the second conversation:
moving a tile for the first participant on a display screen of the device of the third participant from a fifth location to a sixth location, the sixth location being closer to the third camera position than the fifth location; and
replacing the tile of the second participant at the second location with a tile for the third participant.

8. The method of claim 1, wherein identifying the first camera position further comprises:
analyzing the video component of the multimedia feed of the first participant using at least one of an eye tracking algorithm, a face tracking algorithm, and a head tracking algorithm to determine a head orientation of the first participant indicative of the first participant looking at the display screen; and
estimating the first camera position based on the head orientation.

9. The method of claim 1, wherein identifying the first camera position further comprises:
analyzing the video component of the multimedia feed of the first participant using at least one of an eye tracking algorithm, a face tracking algorithm, and a head tracking algorithm to identify when the first participant is looking at the display screen and when the first participant is looking at the camera;
determining a first gaze direction for when the first participant is looking at the display screen and a second gaze direction for when the first participant is looking at the camera; and
estimating the first camera position based on a comparison of the first gaze direction and the second gaze direction.

10. The method of claim 1, wherein identifying the first camera position further comprises:
displaying a visual representation of the display screen;
receiving a user input indicating a location of the camera with respect to the visual representation; and
setting the location as the first camera position.

11. The method of claim 1, wherein identifying the first camera position further comprises:
displaying a camera position indicator on the display screen;
receiving a user input which causes the camera position indicator to move from a first position to a second position, the second position being closer to the camera than the first position; and
setting the second position as the first camera position.

12. A data processing system comprising:
a processor;
a memory in communication with the processor, the memory comprising executable instructions that, when executed by the processor, cause the data processing system to perform functions of:

receiving multimedia streams of a plurality of participants in a multimedia conference, the multimedia streams including audio components and video components;

displaying video tiles on a display screen of a device of at least one of the participants, each of the video tiles showing a video component of one of the multimedia streams;

analyzing the audio components and/or the video components of the multimedia streams to detect characteristics indicative of a first participant and a second participant having a first conversation with each other;

identifying a camera position for a camera of the device; and responsive to identifying that the first participant and the second participant are having the first conversation with each other, moving a video tile for the first participant and a video tile for the second participant to an edge of the display screen in a direction of the camera position.

13. The data processing system of claim 12, wherein analyzing the audio components and/or the video components of each of the multimedia streams further comprises:

analyzing the video components of the multimedia streams to detect visual characteristics indicative of participants having conversations.

14. The data processing system of claim 13, wherein the functions further comprise:

analyzing the video components to detect when gazes of participants switch between a location of a first video tile and a second video tile; and identifying the first participant as a participant associated with the first video tile and the second participant as a participant associated with the second video tile.

15. The data processing system of claim 14, wherein analyzing the video components to detect gazes of participants further comprises:

using eye tracking methods to determine gaze directions of the participants in the video components of the multimedia streams; and identifying the first video tile and the second video tile based on the gaze directions of the participants.

16. The data processing system of claim 12, wherein analyzing the audio components and/or the video components of the multimedia streams further comprises:

analyzing the audio components of the multimedia streams to detect speech characteristics indicative of two participants having the first conversation; and identifying the two participants as the first participant and the second participant based on the speech characteristics.

17. The data processing system of claim 16, wherein the speech characteristics include the two participants speaking in an alternating manner.

18. A non-transitory computer readable medium on which are stored instructions that, when executed, cause a programmable device to perform functions of:

receiving multimedia streams of a plurality of participants in a multimedia conference, the multimedia streams including audio components and video components;

displaying video tiles on a display screen of a device of at least one of the participants, each of the video tiles showing a video component of one of the multimedia streams;

analyzing the audio components and/or the video components of the multimedia streams to detect characteristics indicative of a first participant and a second participant having a first conversation with each other;

identifying a camera position for a camera of the device;

responsive to identifying that the first participant and the second participant are having the first conversation with each other:

moving a video tile for the first participant and a video tile for the second participant to an edge of the display screen in a direction of the camera position.

19. The non-transitory computer readable medium of claim 18, wherein the functions further comprise:

analyzing the audio components and/or the video components of the multimedia streams to detect the first participant and a third participant having a second conversation after the first conversation; and responsive to identifying that the first participant and the third participant having the second conversation:

replacing the video tile of the second participant with a third video tile of the third participant; and returning the video tile of the second participant to a previous position on the display screen.

20. The non-transitory computer readable medium of claim 18, wherein identifying the camera position further comprises:

performing a calibration process on the device in which a user of the device is prompted to provide input indicative of the camera position.

* * * * *